United States Patent
Dong et al.

(10) Patent No.: US 9,437,018 B2
(45) Date of Patent: Sep. 6, 2016

(54) METHOD AND APPARATUS FOR REDUCING ARTIFACTS IN COMPUTED TOMOGRAPHY IMAGE RECONSTRUCTION

(71) Applicant: GE MEDICAL SYSTEMS GLOBAL TECHNOLOGY CO. LLC, Waukesha, WI (US)

(72) Inventors: Shuqin Dong, Beijing (CN); Jiaqin Dong, Beijing (CN); Shou Li, Beijing (CN)

(73) Assignee: GE Medical Systems Global Technology CO. LLC, Waukesha, WI (US)

( * ) Notice: Subject to any disclaimer, the term of this patent is extended or adjusted under 35 U.S.C. 154(b) by 9 days.

(21) Appl. No.: 14/551,601

(22) Filed: Nov. 24, 2014

(65) Prior Publication Data

US 2015/0146955 A1  May 28, 2015

(30) Foreign Application Priority Data

Nov. 25, 2013 (CN) .......................... 2013 1 0601140

(51) Int. Cl.
*G06K 9/00* (2006.01)
*G06T 11/00* (2006.01)

(52) U.S. Cl.
CPC ............ *G06T 11/008* (2013.01); *G06T 11/006* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 7,991,243 | B2 * | 8/2011 | Bal | ................. | G06T 11/008 378/21 |
| 8,503,750 | B2 * | 8/2013 | Benson | ................. | A61B 6/5258 378/4 |
| 8,768,027 | B2 * | 7/2014 | Chen | ................. | G06T 11/005 378/4 |
| 8,891,885 | B2 * | 11/2014 | Kachelriess | ................. | A61B 6/00 382/232 |

(Continued)

OTHER PUBLICATIONS

Kalender et al., "Reduction of CT Artifacts Caused by Metallic Implants", Radiology, vol. No. 164, Issue No. 2, pp. 576-577, Aug. 1987.

(Continued)

*Primary Examiner* — Anand Bhatnagar
(74) *Attorney, Agent, or Firm* — GE Global Patent Operation; Marc A. Vivenzio (57) ABSTRACT

The present invention provides a method and apparatus for reducing artifacts in CT image reconstruction. The method comprises obtaining an original reconstructed image and an original sinogram and determining a proportion of metal pixels in the original reconstructed image. If the proportion is greater than a first threshold value, then generating an expanded metal template based on the original reconstructed image, generating a metal-free, metal artifact reduced (MAR) image based on the expanded metal template and the original sinogram, and generating a final image based on the expanded metal template and the metal-free, MAR image. However, if the proportion of metal pixels is less than a second threshold value, then generating an expanded metal template based on the original reconstructed image, generating a metal-free, metal artifact reduced image based on a treatment, and generating a final image based on the expanded metal template and the metal-free, MAR image.

16 Claims, 6 Drawing Sheets

(56) References Cited

U.S. PATENT DOCUMENTS

| | | | |
|---|---|---|---|
| 2004/0257381 A1* | 12/2004 | Brunner | G06T 11/005 345/626 |
| 2009/0283682 A1* | 11/2009 | Star-Lack | A61B 6/032 250/363.1 |
| 2011/0007956 A1* | 1/2011 | Meyer | A61B 6/032 382/131 |
| 2011/0081071 A1* | 4/2011 | Benson | G06T 11/005 382/154 |
| 2013/0039556 A1* | 2/2013 | Kachelriess | A61B 6/00 382/131 |
| 2014/0328450 A1* | 11/2014 | Pal | G01N 23/046 378/5 |
| 2015/0004561 A1* | 1/2015 | Koehler | A61B 6/14 433/140 |
| 2015/0029178 A1* | 1/2015 | Claus | G06T 11/005 345/419 |

OTHER PUBLICATIONS

Zhao et al., "X-Ray CT Metal Artifact Reduction Using Wavelets: An Application for Imaging Total Hip Prostheses", IEEE Transactions on Medical Imaging, vol. No. 19, Issue No. 12, pp. 1238-1247, Dec. 2000.

Kachelriess et al., "Generalized Multi-dimensional Adaptive Filtering for Conventional and Spiral Single-Slice, Multi-Slice, and Cone-Beam CT", Medical Physics, vol. No. 28, Issue No. 4, pp. 475-490, Apr. 2001.

Man et al., "An Iterative Maximum-Likelihood Polychromatic Algorithm for CT", IEEE Transactions on Medical Imaging, vol. No. 20, Issue No. 10, pp. 999-1008, Oct. 2001.

Roeske et al., "Reduction of Computed Tomography Metal Artifacts Due to the Fletcher-Suit Applicator in Gynecology Patients Receiving Intracavitary Brachytherapy", Brachytherapy, vol. No. 2, Issue 4, pp. 207-214, 2003.

Shechter et al., "The Frequency Split Method for Helical Cone-Beam Reconstruction", Medical Physics, vol. No. 31, Issue No. 8, pp. 2230-2236, Aug. 2004.

Schaaf et al., "Minimizing Clip Artifacts in Multi CT Angiography of Clipped Patients", American Journal of Neuroradiology, vol. No. 27, Issue No. 1, pp. 60-66, Jan. 2006.

Bal et al., "Metal Artifact Reduction in CT Using Tissue-Class Modeling and Adaptive Prefiltering", Medical Physics, vol. No. 33, Issue No. 8, pp. 2852-2859, Aug. 2006.

Murphy et al., "Pose Estimation of Known Objects During Transmission Tomographic Image Reconstruction", IEEE Transactions on Medical Imaging, vol. No. 25, Issue No. 10, pp. 1392-1404, Oct. 2006.

Duan et al., "Metal Artifact Reduction in CT Images by Sinogram TV Inpainting", 2008 IEEE Nuclear Science Symposium Conference Record, pp. 4175-4177, Oct. 19-25, 2008.

Muller et al., "Spurious Structures Created by Interpolation-Based CT Metal Artifact Reduction", Medical Imaging 2009: Physics of Medical Imaging, Proceedings of SPIE, vol. No. 7258, pp. 7258Y-1-7258Y-8, Feb. 7, 2009.

Prell et al., "A Novel Forward Projection-Based Metal Artifact Reduction Method for Flat-Detector Computed Tomography", Physics in Medicine and Biology, vol. No. 54, Issue No. 21, pp. 6575-6591, Nov. 7, 2009.

Boas et al., "The Metal Deletion Technique (MDT), a New Method for Reducing Metal Streak Artifacts in CT Scans", RSNA 2010, pp. 31, 2010.

Meyer et al., "Normalized Metal Artifact Reduction (NMAR) in Computed Tomography", Medical Physics, vol. No. 37, Issue No. 10, pp. 5482-5493, Oct. 2010.

Kyriakou et al., "Empirical Beam Hardening Correction (EBHC) for CT", Medical Physics, vol. No. 37, Issue No. 10, pp. 5179-5187, Oct. 2010.

Slambrouck et al., "A Patchwork (Back)Projector to Accelerate Artifact Reduction in CT Reconstruction", Nuclear Science Symposium Conference Record (NSS/MIC), 2010 IEEE, pp. 2625-2629, Oct. 30, 2010-Nov. 6, 2010.

Meyer et al., "Empirical Scatter Correction (ESC): A New CT Scatter Correction Method And Its Application to Metal Artifact Reduction", IEEE Nuclear Science Symposium Conference Record, Nuclear Science Symposium, pp. 2036-2041, Oct. 30, 2010-Nov. 6, 2010.

Koehler et al., "A New Method for Metal Artifact Reduction in CT", In The International Conference in X-ray Computed Tomography, Salt Lake City, Utah, USA, 2011.

Maass et al., "New Approaches to Region of Interest Computed Tomography", Medical Physics, vol. No. 38, Issue No. 6, pp. 2868-2878, Jun. 2011.

Meyer et al., "Frequency Split Metal Artifact Reduction (FSMAR) in Computed Tomography", Medical Physics, vol. No. 39, Issue No. 4, pp. 1904-1916, Apr. 2012.

Verburg et al., "CT Metal Artifact Reduction Method Correcting for Beam Hardening and Missing Projections", Physics in Medicine and Biology, vol. No. 57, Issue No. 9, pp. 2803-2818, May 2012.

U.S. Appl. No. 13/875,369, filed May 2, 2013, Debashish Pal et al.

* cited by examiner

METHOD AND APPARATUS FOR REDUCING ARTIFACTS IN COMPUTED TOMOGRAPHY IMAGE RECONSTRUCTION

TECHNICAL FIELD

The present invention relates generally to computed tomography (CT) and, more particularly, to a method and apparatus for reducing artifacts in CT reconstruction image.

BACKGROUND

Auxiliary diagnostic apparatus comprise magnetic resonance (MR) systems, ultrasonic systems, computed tomography (CT) systems, positron emission tomography (PET) systems, nuclear medicine and other types of imaging systems.

For example, during CT imaging of a patient by a CT system, X-rays are used for imaging features of inner structures and regions of interest (ROI) of the patient body. The imaging is performed by a CT scanner. In operation, a photograph object is scanned for collection of raw data, and then an image is reconstructed based on the raw data.

An object having high X-ray absorption characteristics such as metal materials and so on can cause artifacts in the reconstructed CT image and thus influence the results of diagnosis. These artifacts can be reduced using existing Metal Artifact Reduction (MAR) techniques. The algorithm of MAR is very complex and its results vary with the properties of metal (e.g., the size, material and shape of the metal).

Clinically, in the case of an artificial knee joint, because it comprises a large volume of metal part and the metal part occupying a large proportion of the cross section of the knee, despite the use of a MAR technique, the metal artifacts of the knee are not significantly reduced as compared with those smaller bone implants that occupy a small proportion of the cross section. This affects the doctor's diagnosis.

Clinically, in the case of an artificial metal tibia, it occupies a small proportion of the cross section of the knee. The use of a MAR technique can cause other problems such as the occurrence of halo around the metal in the image reconstructed using the MAR technique and loss of some image of the metal part. This also affects the doctor's diagnosis.

SUMMARY OF THE INVENTION

According to one embodiment of the present invention, a method of reducing artifacts in CT image reconstruction is provided. The method comprises the steps of: obtaining an original reconstructed image and an original sinogram; and determining a proportion of metal pixels in the original reconstructed image. If the proportion of metal pixels is greater than a first threshold value, then performing the following steps: generating an expanded metal template based on the original reconstructed image, wherein the expanded metal template includes a two-dimensional or three-dimensional expansion for different pixels; generating a metal-free, MAR image based on the expanded metal template and the original sinogram; and generating a final image based on the expanded metal template and the metal-free, MAR image. If the proportion of metal pixels is less than a second threshold value, then performing the following steps: generating an expanded metal template based on the original reconstructed image; generating a metal-free, MAR image based on a treatment including weighting of the expanded metal template and the original sinogram; and generating a final image based on the expanded metal template and the metal-free, MAR image.

According to another embodiment of the present invention, an apparatus for reducing artifacts in CT image reconstruction is provided. The apparatus comprises: an acquisition device configured to obtain an original reconstructed image and an original sinogram; a determining device configured to determine whether a proportion of metal pixels in the original reconstructed image is greater than a first threshold value or less than a second threshold value; and an expanded metal template generating device configured to generate an expanded metal template, wherein when the proportion of metal pixels is greater than a first threshold value, the expanded metal template includes a two-dimensional or three-dimensional expansion for different pixels. The apparatus further comprises: a metal-free, MAR image generating device configured to generate a metal-free, MAR image based on the expanded metal template and the original sinogram, wherein when the proportion of metal pixels is less than a second threshold value, said generating a metal-free, MAR image is based on a treatment including weighting; and a final image generating device configured to generate a final image based on the expanded metal template and the metal-free, MAR image.

According to a further embodiment of the present invention, a CT apparatus is provided. The CT apparatus comprises: a scanner configured to scan an object using X-rays to obtain original data for generating an original reconstructed image; and a processor operably coupled to said scanner and programmable to obtain an original reconstructed image and an original sonogram, and determine a proportion of metal pixels in the original reconstructed image. If the proportion of metal pixels is greater than a first threshold value, then performing the following steps: generating an expanded metal template based on the original reconstructed image, wherein the expanded metal template includes a two-dimensional or three-dimensional expansion for different pixels; generating a metal-free, MAR image based on the expanded metal template and the original sinogram; and generating a final image based on the expanded metal template and the metal-free, MAR image. If the proportion of metal pixels is less than a second threshold value, then performing the following steps: generating an expanded metal template based on the original reconstructed image; generating a metal-free, MAR image based on a treatment including weighting of the expanded metal template and the original sinogram; and generating a final image based on the expanded metal template and the metal-free, MAR image.

According to still a further embodiment of the present invention, a computer program product is provided. The computer program product comprises instructions stored on a nonvolatile recording medium, wherein the instructions, when executed in a processor, perform the steps of the method disclosed in the embodiments of the present invention.

According to yet a further embodiment of the present invention, a nonvolatile storage medium is provided. The nonvolatile storage medium, having stored thereon instructions, which, when executed in a processor, implement the steps of the method disclosed in the embodiments of the present invention.

BRIEF DESCRIPTION OF THE DRAWINGS

To provide a thorough understanding of the present disclosure, the invention is described in detail with reference to the accompanying drawings.

DETAILED DESCRIPTION

In the following detailed description, with reference to the accompanying drawings as a part thereof, embodiments in which the present invention is implemented are illustrated. The embodiments are set forth with sufficient details to enable persons skilled in the art to carry out the present invention. It shall be understood that the embodiments can be combined or alternative embodiments can be used and that structural, logical and electrical modifications can be made, without departing from the scope of the various embodiments of the present invention. Therefore, the following detailed description shall not be interpreted as limitative, but rather as illustrative. The scope of the present invention shall be defined by the appended claims and the equivalents thereof.

Figure 1:
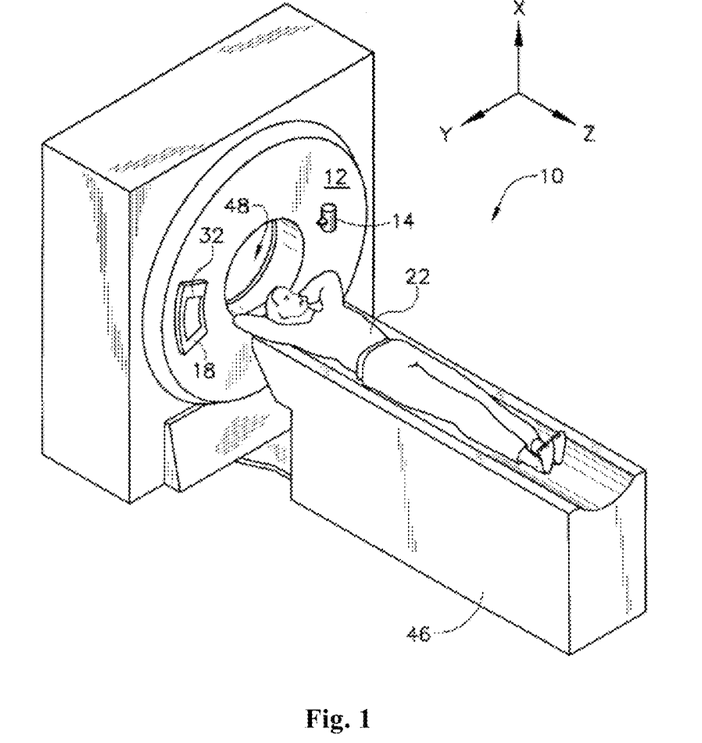
FIG. 1 is a configuration diagram of a CT imaging system according to an embodiment of the present disclosure.
Figure 2:
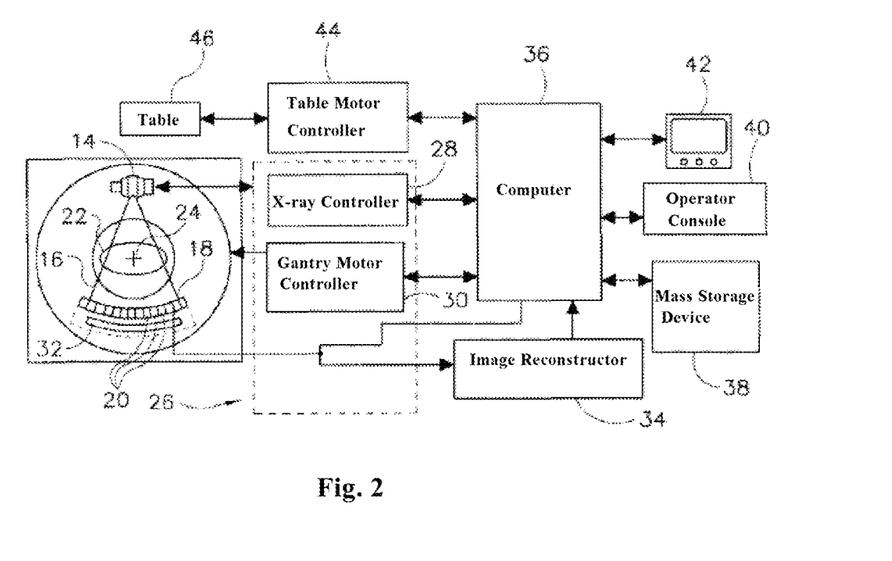
FIG. 2 is a schematic block diagram of the system shown in FIG. 1.

Referring to FIGS. 1 and 2, a CT imaging system 10 is shown as including a gantry 12. In an embodiment, the system 10 comprises a "third generation" CT scanner. The gantry 12 contains an X-ray source 14 that projects a beam of X-rays 16 towards a detector assembly 18 on the opposite side of the gantry 12. The detector assembly 18 comprises a plurality of detectors 20 and a data acquisition system (DAS) 32. Said plurality of detectors 20 sense projected X-rays that pass through a medical patient 22. Each detector 20 produces an analog electrical signal that represents the intensity of the X-ray beam impinging on and hence being attenuated by the patient as it passes through the patient 22. A detector 20 generally includes a collimator for collimating the X-ray beam received at the detector, a scintillator adjacent the collimator for converting the X-ray into luminous energy, and a photodiode for receiving luminous energy from an adjacent scintillator and producing an electrical signal therefrom. Generally, each scintillator in the scintillator array converts X-rays into luminous energy and releases the luminous energy towards an adjacent photodiode. Each photodiode detects luminous energy and generates a corresponding electrical signal. Each detector 20 in the detector array 18 produces a separate electrical signal. The electrical signal represents the intensity of an impinging radiation beam (for example, an X-ray beam) and hence can be used to estimate the attenuation of the radiation beam as it passes through an object or the patient 22.

During a scan to acquire X-ray projection data, the gantry 12 and the components mounted thereon rotate around a center of rotation 24. The rotation of the gantry 12 and the operation of the X-ray source 14 can be governed by a control mechanism 26 of the CT system 10. The control mechanism 26 comprises an X-ray controller 28 that provides power and timing signals to the X-ray source 14 and a gantry motor controller 30 that controls the rotational speed and position of the gantry 12. The DAS 32 in the control mechanism 26 samples analog data from the detectors 20 and converts the analog data into digital signals for subsequent processing. The output of DAS 32 includes projection data set in attenuation measurement obtained at a particular gantry rotation angle (e.g. angle of view). When the gantry 12 rotates, a plurality of views can be obtained in a single rotation. A single rotation refers to a complete 360 degree revolution of the gantry 12. Each view has a corresponding angle of view and a particular position on the gantry 12.

The reconstructed image is used as an input to a computer 36, which stores the image in a mass storage device 38.

The computer 36 also receives commands and scan parameters from an operator via an operator console 40. The operator console 40 has a certain form of operator interface, such as a keyboard, a mouse, a voice-activated controller, or any other suitable input devices. An associated display 42 allows the operator to view other data and reconstructed images from the computer 36. The commands and parameters from the operator can be used by the computer 36 to provide control signals and information to the DAS 32, the X-ray controller 28, and the gantry motor controller 30. In addition, the computer 36 operates a table motor controller 44, which controls a motorized table 46 to position the patient 22 and the gantry 12. In particular, the table 46 moves the patient entirely or partially through a gantry opening 48 as shown in FIG. 1.

In one embodiment, the computer 36 includes a device 50, for example, a floppy disk drive, CD-ROM drive, DVD drive, magnetic optical disk (MOD) device, or any other digital device including a network connecting device such as an Ethernet device, for reading instructions and/or data from a computer-readable medium 52, such as a floppy disk, a CD-ROM, a DVD or another digital source such as a network or the Internet, as well as yet to be developed digital devices. In another embodiment, the computer 36 executes instructions stored in firmware (not shown). In some configurations, the computer 36 and/or image reconstructor 34 is/are programmed to execute the functions stated herein.

Figure 4:
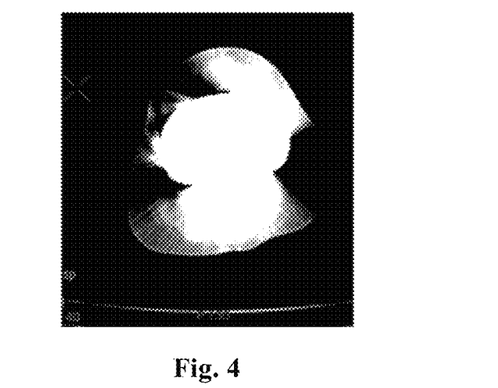
FIG. 4 shows an original reconstructed image without using a metal artifact reduction technique.
Figure 5:
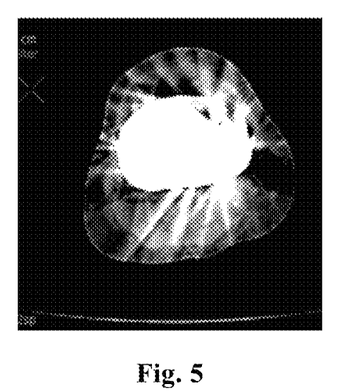
FIG. 5 shows an image reconstructed using an existing metal artifact reduction technique.

In the following embodiment, the projection of a knee is taken as an example to illustrate the present disclosure. In this example, an artificial knee is used. The artificial knee comprises metal and has a complex three-dimensional structure. For example, an artificial knee usually comprises a patella assembly, a femur connecting portion, a tibia connection portion, and so on. The metal part occupies a large proportion in the reconstructed image of the knee. FIG. 4 shows an original reconstructed image Iorig generated without using a metal artifact reduction technique. As can be seen, there are numerous thin lines and the metal part as shown is expanded to some extent and inconsistent with the reality. FIG. 5 shows a reconstructed image Imar generated using an existing metal artifact reduction technique. The existing metal artifact reduction technique comprises, for example, the following steps: determining the metal projection area in the original reconstructed image Iorig; performing an interpolation correction on the projection values in the metal projection area; and recovering the reconstruction of the original reconstructed image Iorig. As can be seen, in the reconstructed image generated using an existing metal artifact reduction technique, there are still many white thin lines and the metal portion as shown is slightly distorted, i.e. the correction of the artifacts is not obvious. For metal implants that have a complex metal structure and occupy a large proportion in the reconstructed image, the existing techniques are often not satisfactory in reducing the metal artifacts.

Figure 3:
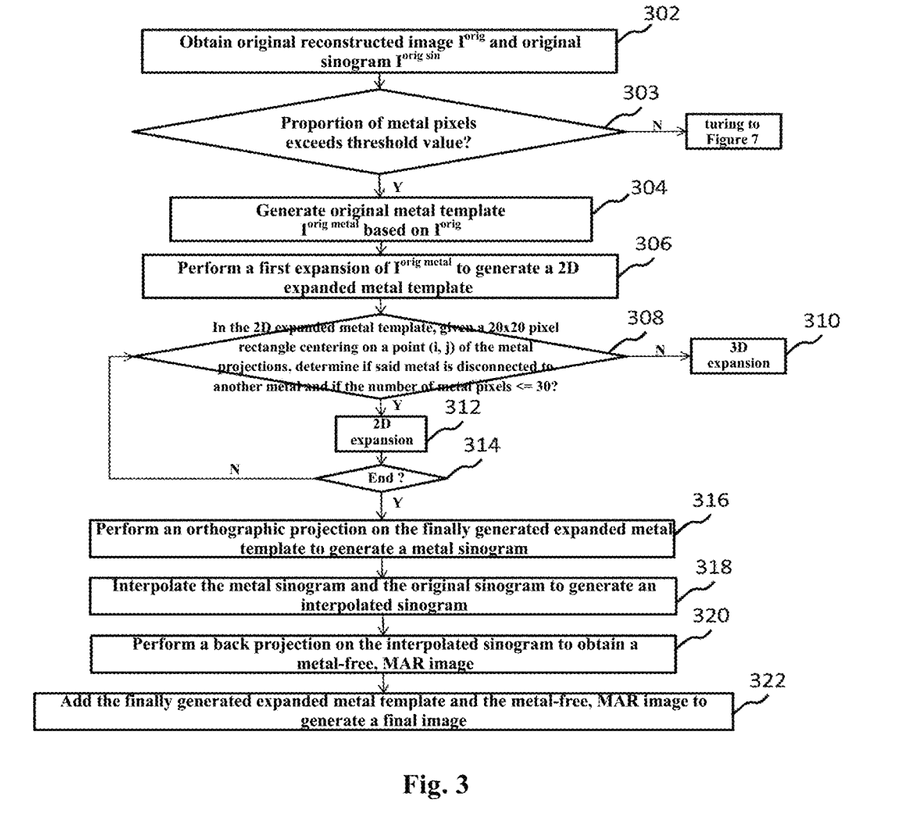
FIG. 3 is a processing flowchart of a metal artifact reduction technique according to an embodiment of the present disclosure.
Figure 7:
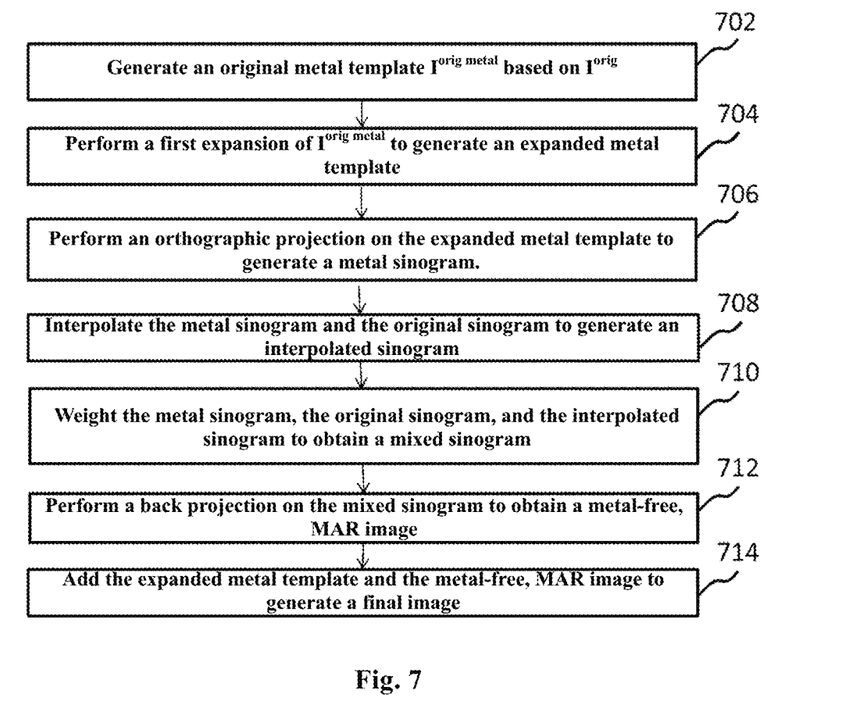
FIG. 7 is a processing flowchart of a metal artifact reduction technique according to an embodiment of the present disclosure.

FIG. 3 is a processing flowchart of a metal artifact reduction technique according to an embodiment of the present disclosure. First, at step 302, an original reconstructed image Iorig and an original sinogram Iorig sin are obtained. The original reconstructed image Iorig and the original sinogram Iorig sin may be inputted after reconstruction of the projection data of the DAS 32 in the image reconstructor 34, or obtained from the mass storage device 38, or alternatively, obtained from the computer 36. At step 303, a determination is made as to whether the proportion of the number of metal pixels to the total number of pixels is greater than a first threshold value or less than a second threshold value, and if the proportion exceeds the first threshold value, then the process proceeds to step 304; or if the proportion is less than the second threshold value, the process proceeds to step 702 as shown in FIG. 7. The determination may be based simply on statistics of the pixels whose pixel value is greater than 4000. The first and second threshold values can be manually determined according to experimental results. Preferably, the first threshold value is greater than the second threshold value. Of course, the first threshold value may be equal to the second threshold value. Since this example uses the projection of an artificial knee, and it is clear that the proportion of metal pixels exceeds the first threshold value, the process proceeds to step 304.

In the case where the proportion of the number of metal pixels to the total number of pixels exceeds a first threshold value, at step 304, an original metal template brig metal is generated. For example, if the pixel value (also called CT value) of a pixel in the original image is greater than 4000, then it is regarded as a metal pixel. Otherwise, it is regarded as a non-metal pixel. A metal pixel is set to 1 and a non-metal pixel is set to 0. Then, at step 306, the original metal template is subjected to a first expansion to generate a 2D expanded metal template. The expansion can be carried out in the following manner: if the pixel value (CT value) of a pixel in the original image is greater than 4000, assuming the coordinate of said pixel is (i, j), then the pixels at (i+1, j), (i−1, j), (i, j+1), (i, j−1), (i+1, j+1), (i+1, j−1), (i−1, j+1), (i−1, j−1) are all set to 1, namely, the 8 points around (i, j) are all set as metal. Next, at step 308, in the 2D expanded metal template, a 20×20 pixel rectangle centering on the metal pixel (i, j) is taken to determine whether the boundary of the rectangle is metal, i.e., whether metal pixels in said rectangle neighbor metal pixels in other parts, and whether the number of metal pixels in the rectangle is less than 30. If the result of at least one of the above two determinations is negative, then at step 310, a 3D expansion is performed on said pixel of the original metal template. Alternatively, if the results of the above two determinations are both positive, a 2D expansion is applied to said pixel of the original metal template at step 312. The process is repeated to cover all pixels in the 2D expanded metal template, namely, at step 314, it is judged whether there is any metal pixel that has not been covered. If yes, step 308 is repeated, and if not, then the process comes to an end to obtain a metal template including a 2D or 3D expansion for different pixels, and the subsequent steps are continued. At step 316, an orthographic projection is performed on the generated expanded metal template to obtain a metal sinogram. Then, at step 318, an interpolation is performed on the metal sinogram and the original sinogram to generate an interpolated sinogram. Next, at step 320, a back projection is performed on the interpolated sinogram to generate a metal-free, MAR image. Finally, at step 322, the metal template including 2D or 3D expansion for different pixels and the metal-free, MAR image, obtained above, are added to obtain the final reconstructed image Ifinal.

Figure 6:
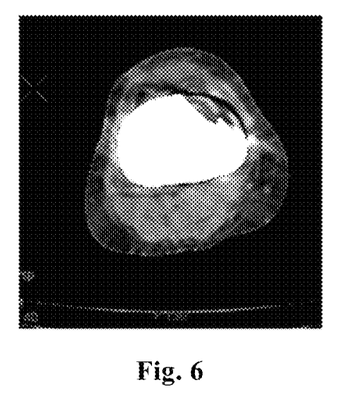
FIG. 6 shows a final image reconstructed using a metal artifact reduction technique according to an embodiment of the present disclosure.

The generated final reconstructed image Ifinal is as shown in FIG. 6. It can clearly be seen that the artifacts in the form of thin lines are substantially removed and the image of the metal part reflects the reality.

Figure 8:
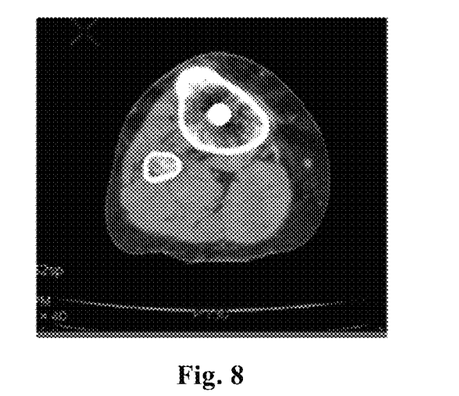
FIG. 8 shows an original reconstructed image without using a metal artifact reduction technique.
Figure 9:
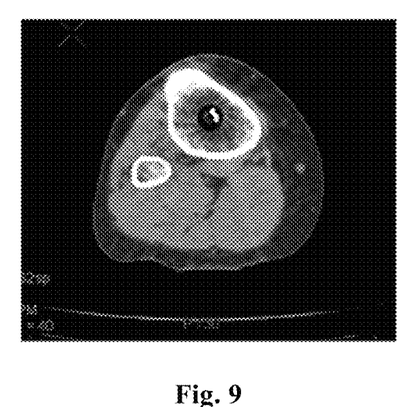
FIG. 9 shows an image reconstructed using an existing metal artifact reduction technique.

In the following embodiment, the projection of a knee is taken as an example to illustrate the present disclosure. However, in this example, instead of using an artificial knee, an artificial tibia is used. The artificial tibia is made of metal and the metal part occupies a very small proportion in the reconstructed image of the knee. FIG. 8 shows an original reconstructed image Iorig generated without using a metal artifact reduction technique. FIG. 9 shows a reconstructed image Imar generated using an existing metal artifact reduction technique. The existing metal artifact reduction technique comprises, for example, the following steps: determining the metal projection area in the original reconstructed image Iorig, performing an interpolation correction on the projection values in the metal projection area, and recovering the reconstruction of the original reconstructed image Iorig. As can be seen, in the reconstructed image generated using an existing metal artifact reduction technique, the metal part as shown is slightly distorted, i.e. the correction of the artifacts is not obvious. For metal implants that occupy a very small proportion in the reconstructed image, the existing techniques often are not satisfactory in reducing the metal artifacts.

FIG. 7 is a processing flowchart of a metal artifact reduction technique according to another embodiment of the present disclosure. Regarding the above example where an artificial tibia is used, in the case where the proportion of the number of metal pixels to the total number of pixels is less than the second threshold value, at step 702, an original metal template brig metal is generated, for example, in such a manner: if the pixel value (also called CT value) of a pixel in the original image is greater than 4000, then it is regarded as a metal pixel; otherwise, it is regarded as a non-metal pixel. A metal pixel is set to 1 and a non-metal pixel is set to 0. At step 704, the original metal template is subjected to an expansion to generate an expanded metal template, usually a 2D expanded metal template. The expansion can be carried out in the following manner: if the pixel value (CT value) of a pixel in the original image is greater than 4000, assuming the coordinate of said pixel is (i, j), then the pixels at (i+1, j), (i−1, j), (i, j+1), (i, j−1), (i+1, j+1), (i+1, j−1), (i−1, j+1), (i−1, j−1) are all set to 1, namely, the 8 points around (i, j) are all set as metal. Next, at step 706, an orthographic projection is performed on the generated expanded metal template to obtain a metal sinogram. Then, at step 708, an interpolation is performed on the metal sinogram and the original sinogram to generate an interpolated sinogram. Next, at step 710, the metal sinogram, the original sinogram, and the interpolated sinogram are weighted to obtain a mixed sinogram. Said weighting is performed in the following manner:

Subtracting the metal sinogram fmetal from the original sinogram forig to obtain a difference forig-metal, and comparing the difference with the interpolated sinogram $f^{interpolation}$ for calculation of an coefficient coef as follows:

$$\begin{cases} coef = 1/(f^{orig\text{-}metal} - f^{interpolation}) & \text{if } f^{orig\text{-}metal} < f^{interpolation} \\ coef = 0 & \text{if } f^{orig\text{-}metal} > f^{interpolation} \end{cases} \quad (1)$$

Then let T be:

$$\begin{cases} T = coef & \text{if } f^{orig\text{-}metal} < f^{interpolation} \\ T = 1 - coef & \text{if } f^{orig\text{-}metal} > f^{interpolation} \end{cases} \quad (2)$$

Two parameters p1 and p2 are calculated using a maximum value f max and a minimum value f min of the metal sinogram:

$$p1 = \alpha * f\min + (1-\alpha) * f\max \quad (3)$$

$$p2 = (1-\beta) * f_{min} + \beta * f\max \quad (4)$$

wherein α and β are obtained by experiment, and a best image quality is obtained when α is 0.35 and β is 0.95.

Then a t is calculated as follows:

$$t = \frac{f^{orig} - p1}{p2 - p1} \quad (5)$$

Next, a weight w is calculated as follows:

$$\begin{cases} w = w_{max} * T & \text{if } f(v, c, r) < p1 \\ w = w_{max}(1 - (6*t^5 - 15*t^4 + 10*t^3)) * T & \text{if } p2 > f(v, c, r) \geq p1 \\ w = 0 & \text{if } f(v, c, r) \geq p2 \end{cases} \quad (6)$$

wherein $W_{max}$ is a fixed value 0.5, and f (v,c,r) represents the projection value for view v, channel c, and row r;

Performing a weighting calculation using the above weight to obtain a mixed sinogram $f^{blend}$:

$$f^{blend} = w * f^{orig\text{-}Metal} + (1-w) * f^{interpolation}$$

Next, at step 712, a back projection is performed on the mixed sinogram to obtain a metal-free, MAR image. Finally, at step 714, the expanded metal template and the metal-free, MAR image obtained above are added to obtain a final reconstructed image Ifinal.

Figure 10:
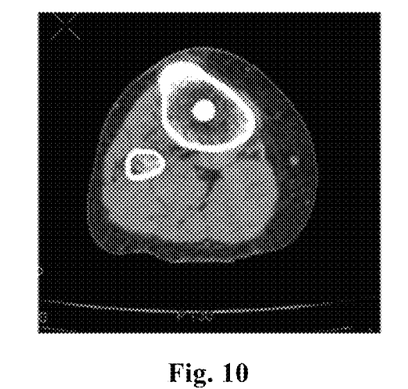
FIG. 10 shows a final image reconstructed using a metal artifact reduction technique according to an embodiment of the present disclosure.

The generated final reconstructed image Ifinal is as shown in FIG. 10. It can be seen that the halo is removed and the image of the metal part is intact.

Figure 11:
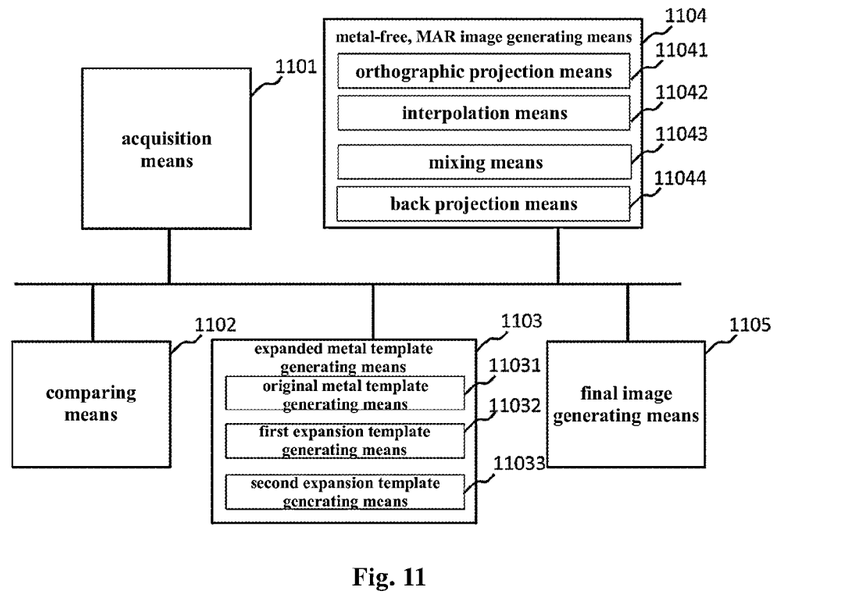
FIG. 11 is a block diagram of a metal artifact reduction apparatus for image reconstruction according to an embodiment of the present disclosure.

FIG. 11 is a block diagram of a metal artifact reduction apparatus for image reconstruction according to various embodiments of the present disclosure. The apparatus 1100 for reducing artifacts in CT image reconstruction comprises acquisition means 1101, comparing means 1102, expanded metal template generating means 1103, metal-free, MAR image generating means 1104, and final image generating means 1105. The acquisition means 1101 is coupled at least to the comparing means 1102, the expanded metal template generating means 1103, and the metal-free, MAR image generating means 1104. The expanded metal template generating means 1103 is further coupled at least to the metal-free, MAR image generating means 1104. The final image generating means 1105 is coupled at least to the expanded metal template generating means 1103 and the metal-free, MAR image generating means 1104. In FIG. 11, for convenience of illustration, the various means are coupled to each other. However, it shall be noted that the various means can be coupled in other possible manners as long as they can realize the functions described below. Moreover, functions of several can be combined in one apparatus and each means can be further divided into multiple means to implement the function, and there can be more than one identical means in the system.

The acquisition means 1101 is mainly used to obtain an original reconstructed image and an original sinogram. The comparing means 1102 is mainly used to determine whether a proportion of metal pixels in the original reconstructed image is greater than a first threshold value or lower than a second threshold value. The expanded metal template generating means 1103 is mainly used to generate, depending on the result of the comparing means 1102, an original metal template using an original metal template generating means 11031 thereof, a 2D expanded metal template via a 2D expansion performed by a first expansion template generating means 11032 thereof, or a metal template including a 2D or 3D expansion for different pixels via a 2D and 3D mixed expansion performed by a second expansion template generating means 11033 thereof. The metal-free, MAR image generating means 1104 is mainly used to obtain a metal-free, MAR image in the following manner: using an orthographic projection means 11041 thereof to perform an orthographic projection on the generated expanded metal template to generate a metal sinogram; using an interpolation means 11042 thereof to interpolating the metal sinogram and the original sinogram to generate an interpolated sinogram, or using a mixing means 11043 thereof to perform a weighting of the metal sinogram, the original sinogram, and the interpolated sinogram to obtain a mixed sinogram; and using a back projection means 11044 thereof to perform a back projection on the interpolated sinogram or mixed sinogram to obtain a metal-free, MAR image. The final image generating means 1105 is mainly used to add the finally generated expanded metal template and the metal-free, MAR image to generate the final image.

The acquisition means 1101 obtains an original reconstructed image Iorig and an original sinogram Iorig sin. The original reconstructed image Iorig and the original sinogram Iorig sin may be inputted after reconstruction of the projection data of the DAS 32 in the image reconstructor 34, or obtained from the mass storage device 38, or alternatively, obtained from the computer 36. The comparing means 1102 determines whether the proportion of the number of metal pixels to the total number of pixels is greater than a first threshold value or less than a second threshold value. The determination may be based simply on statistics of the pixels whose pixel value is greater than 4000. The first and second threshold values can be manually determined according to experimental results. Preferably, the first threshold value is greater than the second threshold value.

In the case where the proportion of the number of metal pixels to the total number of pixels exceeds a first threshold value, the original metal template generating means 11031 of the expanded metal template generating means 1103 generates an original metal template Iorig metal, for example, in such a manner: if the pixel value (also called CT value) of a pixel in the original image is greater than 4000, then it is regarded as a metal pixel; otherwise, it is regarded as a non-metal pixel. A metal pixel is set to 1 and a non-metal pixel is set to 0. Then, a first expansion is applied to the original metal template by the first expansion template generating means 11032 of the expanded metal template generating means 1103 to generate a 2D expanded metal template. The first expansion can be carried out in the following manner: if the pixel value (CT value) of a pixel in the original image is greater than 4000, assuming the coordinate of said pixel is (i, j), then the pixels at (i+1, j), (i−1, j), (i, j+1), (i, j−1), (i+1, j+1), (i+1, j−1), (i−1, j+1), (i−1, j−1) are all set to 1, namely, the 8 points around (i, j) are all set as metal. Next, at step 308, in the 2D expanded metal template, a 20×20 pixel rectangle centering on the metal pixel (i, j) is taken to determine whether the boundary of the rectangle is metal, i.e., whether metal pixels in said rectangle neighbor metal pixels in other parts, and whether the number of metal pixels in the rectangle is less than 30. If the result of at least one of the above two determinations is negative, then a 3D expansion is applied to said pixel of the original metal template by the second expansion template generating means 11033 of the expanded metal template generating means 1103. Alternatively, if the results of the above two determinations are both positive, a 2D expansion is applied to said pixel of the original metal template by the second expansion template generating means 11033 of the expanded metal template generating means 1103. The process is repeated to cover all pixels in the 2D expanded metal template to obtain a 2D or 3D expanded metal template for different pixels. Next, an orthographic projection is performed on the generated expanded metal template by the orthographic projection means 11041 of the metal-free, MAR image generating means 1104 to obtain a metal sinogram. Then, an interpolation is performed on the metal sinogram and the original sinogram by the interpolation means 11042 of the metal-free, MAR image generating means 1104 to obtain an interpolated sinogram. Next, a back projection is performed on the interpolated sinogram by the back projection means 11044 of the metal-free, MAR image generating means 1104 to obtain a metal-free, MAR image. Finally, the metal template including 2D or 3D expansion for different pixels obtained above and the metal-free, MAR image are added by the final image generating means 1105 to obtain the final reconstructed image Ifinal.

The generated final reconstructed image Ifinal is as shown in FIG. 6. It can clearly be seen that the artifacts in the form of thin lines are substantially removed and the image of the metal part reflects the reality.

In the case where the proportion of the number of metal pixels to the total number of pixels is less than the second threshold value, the original metal template generating means 11031 of the expanded metal template generating means 1103 generates an original metal template brig metal, for example, in such a manner: if the pixel value (also called CT value) of a pixel in the original image is greater than 4000, then it is regarded as a metal pixel; otherwise, it is regarded as a non-metal pixel. A metal pixel is set to 1 and a non-metal pixel is set to 0. Then, an expansion is applied to the original metal template by the expanded metal template generating means 1103 to generate an expanded metal template, usually a 2D expanded metal template, for example by a first expansion template generating means 11032 thereof. The expansion can be carried out in the following manner: if the pixel value (CT value) of a pixel in the original image is greater than 4000, assuming the coordinate of said pixel is (i, j), then the pixels at (i+1, j), (i−1, j), (i, j+1), (i, j−1), (i+1, j+1), (i+1, j−1), (i−1, j+1), (i−1, j−1) are all set to 1, namely, the 8 points around (i, j) are all set as metal. Next, an orthographic projection is performed on the generated expanded metal template by the orthographic projection means 11041 of the metal-free, MAR image generating means 1104 to obtain a metal sinogram. Then, an interpolation is performed on the metal sinogram and the original sinogram by the interpolation means 11042 of the metal-free, MAR image generating means 1104 to obtain an interpolated sinogram. Next, a weighting of the metal sinogram, the original sinogram, and the interpolated sinogram is performed by the mixing means 11043 of the metal-free, MAR image generating means 1104 to obtain a mixed sinogram. The weighting is performed in the following manner:

Subtracting the metal sinogram fmetal from the original sinogram forig to obtain a difference forig-metal, and comparing the difference with the interpolated sinogram $f^{interpolation}$ for calculation of an coefficient coef as follows:

$$\begin{cases} coef = 1/(f^{orig\text{-}metal} - f^{interpolation}) & \text{if } f^{orig\text{-}metal} < f^{interpolation} \\ coef = 0 & \text{if } f^{orig\text{-}metal} > f^{interpolation} \end{cases} \quad (1)$$

Then let T be:

$$\begin{cases} T = coef & \text{if } f^{orig\text{-}metal} < f^{interpolation} \\ T = 1 - coef & \text{if } f^{orig\text{-}metal} > f^{interpolation} \end{cases} \quad (2)$$

Calculating two parameters p1 and p2 using a maximum value f max and a minimum value f min of the metal sinogram:

$$p1 = \alpha * f\min + (1-\alpha) * f\max \quad (3)$$

$$p2 = (1-\beta) * f_{min} + \beta * f\max \quad (4)$$

wherein α and β are obtained by experiment, and a best image quality is obtained when α is 0.35 and β is 0.95. Then, a t can be calculated as follows:

$$t = \frac{f^{orig} - p1}{p2 - p1} \quad (5)$$

Next, a weight w is calculated as follows:

$$\begin{cases} w = w_{max} * T & \text{if } f(v, c, r) < p1 \\ w = w_{max}(1 - (6*t^5 - 15*t^4 + 10*t^3))*T & \text{if } p2 > f(v, c, r) \geq p1 \\ w = 0 & \text{if } f(v, c, r) \geq p2 \end{cases} \quad (6)$$

wherein $W_{max}$ is a fixed value 0.5, and f (v,c,r) represents the projection value for view v, channel c, and row r;

Performing a weighting calculation using the above weight to obtain a mixed sinogram $f^{blend}$:

$$f^{blend} = w * f^{orig\text{-}Metal} + (1-w) * f^{interpolation}$$

Next, a back projection is performed on the mixed sinogram by the back projection means 11044 of the metal-free, MAR image generating means 1104 to obtain a metal-free, MAR image. Finally, the expanded metal template and the metal-free, MAR image obtained above are added by the final image generating means 1105 to obtain a final reconstructed image $I^{final}$.

The generated final reconstructed image Ifinal is as shown in FIG. 10. It can clearly be seen that the halo is removed and the image of the metal part is intact.

As used herein, the term "a" or "an" is intended to mean both singular and plural. The term "or" means a nonexclusive "or", unless otherwise indicated.

Also as used herein, the phrase "reconstructing an image" is not intended to exclude embodiments of the present invention in which data representing an image, instead of a viewable image, is generated. Therefore, the term "image" refers generally to viewable images and data representing a viewable image. However, many embodiments generate (or are configured to generate) at least one viewable image.

The operation environment of the present invention has been described with respect to a 16-slice X-ray CT system. However, one skilled in the art will appreciate that the present disclosure is also applicable to multi-slice configuration systems, and to the systems capable of moving or "jittering" focus during operation. Moreover, the present disclosure is described with regard to the detection and conversion of X-rays. However, one skilled in the art would further appreciate that the present disclosure is also applicable to detection and conversion of other high frequency electromagnetic energies. Although the specific embodiments mentioned above are described with reference to a third generation CT system, the methods described herein also apply to fourth generation CT systems (e.g., stationary detector with rotating X-ray source) and fifth generation CT systems (stationary detector and X-ray source). Additionally, it is contemplated that the benefits of the disclosure accrue to imaging modalities other than CT, such as magnetic resonance imaging (MRI), single-photon emission computed tomography (SPECT) and PET.

Various embodiments or the components thereof may be implemented as a part of a computer system. The computer system may include a computer, an input device, a display unit and an interface, for example for accessing the Internet. The microprocessor can be connected to the communication bus. The computer may also include a memory. The memory may include a random access memory (RAM) and a read only memory (ROM). The computer system may further include a storage device, which may be a hard disk drive or a removable storage device such as a floppy disk drive and an optical drive. The storage device can also be used in other similar devices for loading computer programs or other instructions into the computer system.

In various embodiments of the present disclosure, the method for reducing artifacts in CT reconstruction as described herein may be embodied in the form of a processing machine. Typical examples of processing machines include general purpose computers, programmed microprocessors, digital signal processors (DSPs), microcontrollers, peripheral integrated circuit elements, and other devices or device arrangements able to implement the method steps described herein.

As used herein, the term "computer" is not limited to those integrated circuits referred to in the art as computers, but may include any processor-based or non-processor-based systems, including systems using microcontrollers, reduced instruction set circuits (RISC), application specific integrated circuits (ASIC), logic circuits, and any other circuits or processor capable of performing the functions described herein. The above examples are exemplary only, and are not intended in any way to limit the definition and/or meaning of the term "computer". The terms such as computers, processors, microcontrollers, microcomputers, programmable logic controllers, application specific integrated circuits, and other programmable circuits are used interchangeably herein.

A processing mechanism executes a set of instructions (e.g., corresponding to the method steps), which are stored in one or a plurality of storage elements (also known as computer-usable medium). The memory element can take the form of a database or physical storage elements in the processing machine. The memory element can also hold as needed data or other information. Physical memory may be, for example, but not limited to, electronic, magnetic, optical, electromagnetic, infrared, or semiconductor systems, apparatuses, devices, or propagation media. More specific examples of physical memory may include, but not limited to, random access memories (RAM), read only memories (ROM), erasable programmable read-only memories (EPROM or Flash memory), hard disk drives (HDD) and CD-ROM memories (CDROM). These memory types are exemplary only, and thus the types of the memory that can be used for storing a computer program are not limitative.

The instruction set may include various commands, which instruct the processing machine to perform specific operations, such as the processes in various embodiments of the present disclosure. The instruction set may be in the form of a software program. Software may be in various forms of system software or application software. In addition, the software may be an independent program, a program module in a larger program, or a set of some program modules. The software also may include a modularized program design in the form of an object-oriented programming. A processing machine may process input data in response to a user's command, or a result of a previous processing, or a request sent from another processing machine.

In various embodiments of the present invention, the method for reducing artifacts in CT reconstruction can be implemented by software, hardware, or a combination thereof. For example, the method provided in various embodiments of the present disclosure can be implemented in software by using standard programming language (such as C, C++, Java, etc). As used herein, the terms "software" and "firmware" can be used interchangeably, and may include any computer programs stored in a memory for execution by a computer.

In addition, although the method stated herein is described with respect to an X-ray CT system used in a medical situation, it can be expected that these benefits may facilitate MR systems, PET systems, nuclear medicine, and other types of imaging systems. The operations can be applied to specific organs or structures, including biological organs such as brain, stomach, heart, lung or liver; biological structures, such as diaphragm, chest wall, chest, ribs, spine, breastbone or pelvis; tumor, injury or sore, for example, compression fracture.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reducing artifacts in computed tomography (CT) image reconstruction, comprising:
   obtaining an original reconstructed image and an original sinogram; and
   determining a proportion of metal pixels in the original reconstructed image;
      wherein, if the proportion of metal pixels is greater than a first threshold value, then the method further comprises:
         generating an expanded metal template based on the original reconstructed image, wherein the expanded metal template includes a two-dimensional or three-dimensional expansion for different pixels,
         generating a metal-free, metal artifact reduced (MAR) image based on the expanded metal template and the original sinogram, and
         generating a final image based on the expanded metal template and the metal-free, MAR image; and
      wherein, if the proportion of metal pixels is less than a second threshold value, then the method further comprises:
         generating an expanded metal template based on the original reconstructed image,
         generating a metal-free, MAR image based on a treatment including weighting of the expanded metal template and the original sinogram, and
         generating a final image based on the expanded metal template and the metal-free, MAR image.

2. The method for reducing artifacts in CT image reconstruction according to claim 1, wherein generating an expanded metal template based on the original reconstructed image, when the proportion of metal pixels is greater than a first threshold value, further comprises:
   generating an original metal template;
   performing a first expansion of the original metal template to generate a two-dimensional expanded metal template; and
   performing a second expansion of the original metal template based on said two-dimensional expanded metal template to generate said expanded metal template, including a two-dimensional or three-dimensional expansion for different pixels.

3. The method for reducing artifacts in CT image reconstruction according to claim 2, wherein performing said second expansion comprises:
   in the two-dimensional expanded metal template, for each metal pixel, given a 20×20 pixel rectangle centering on said metal pixel, if no metal exists on the boundary of the 20×20 pixel rectangle and the number of metal pixels within the 20×20 pixel rectangle is not greater than 30, then performing a 2D expansion on said metal pixel of the original metal template; otherwise, performing a 3D expansion on said metal pixel of the original metal template.

4. The method for reducing artifacts in CT image reconstruction according to claim 1, wherein the step of generating a metal-free, MAR image, when the proportion of metal pixels is greater than a first threshold value comprises:
   performing an orthographic projection on the expanded metal template to generate a metal sinogram;
   interpolating the metal sinogram and the original sinogram to generate an interpolated sinogram; and
   performing a back projection on the interpolated sinogram to generate the metal-free, MAR image.

5. The method for reducing artifacts in CT image reconstruction according to claim 1, wherein the step of generating a metal-free, MAR image, when the proportion of metal pixels is less than a second threshold value comprises:
   performing an orthographic projection on the expanded metal template to generate a metal sinogram;
   interpolating the metal sinogram and the original sinogram to generate an interpolated sinogram;
   weighting the metal sinogram, the interpolated sinogram and the original sinogram to generate a mixed sinogram; and
   performing a back projection on the mixed sinogram to generate the metal-free, MAR image.

6. The method for reducing artifacts in CT image reconstruction according to claim 5, wherein the step of weighting comprises:
   subtracting the metal sinogram fmetal from the original sinogram forig to obtain a difference forig-metal, and comparing the difference with the interpolated sinogram $f^{interpolation}$ for calculation of a coefficient coef as follows:

$$\begin{cases} coef = 1/(f^{orig\text{-}metal} - f^{interpolation}) & \text{if } f^{orig\text{-}metal} < f^{interpolation} \\ coef = 0 & \text{if } f^{orig\text{-}metal} > f^{interpolation} \end{cases};$$

then let T be:

$$\begin{cases} T = coef & \text{if } f^{orig\text{-}metal} < f^{interpolation} \\ T = 1 - coef & \text{if } f^{orig\text{-}metal} > f^{interpolation} \end{cases};$$

calculating two parameters p1 and p2 using a maximum value f max and a minimum value f min of the metal sinogram, $$p1 = \alpha * f\text{min} + (1-\alpha) * f\text{max}$$

$$p2 = (1-\beta) * f_{min} + \beta * f\text{max}$$

wherein $\alpha$ and $\beta$ are obtained by experiment; let $\alpha$ be 0.35 and $\beta$ be 0.95 to calculate t as follows:

$$t = \frac{f^{orig} - p1}{p2 - p1};$$

then calculating a weight w as follows:

$$\begin{cases} w = w_{max} * T & \text{if } f(v, c, r) < p1 \\ w = w_{max}(1 - (6*t^5 - 15*t^4 + 10*t^3)) * T & \text{if } p2 > f(v, c, r) \geq p1 \\ w = 0 & \text{if } f(v, c, r) \geq p2 \end{cases}$$

wherein $W_{max}$ is a fixed value 0.5, and f (v,c,r) represents the projection value for view v, channel c, and row r;
performing a weighting using the above weight to obtain a mixed sinogram fblend:

$$f^{blend} = w * f^{orig\text{-}Metal} + (1-w) * f^{interpolation}.$$

7. The method for reducing artifacts in CT image reconstruction according to claim 1, wherein the step of generating a final image comprises:

adding the expanded metal template and the metal-free, MAR image to generate the final image.

8. The method for reducing artifacts in CT image reconstruction according to claim 1, wherein the first threshold value is greater than the second threshold value.

9. A computed tomography apparatus, comprising:
a scanner for scanning an object using X-rays to obtain original data for generating an original reconstructed image; and
a processor operably coupled to said scanner and programmable to obtain an original reconstructed image and an original sinogram, and programmable to determine a proportion of metal pixels in the original reconstructed image,
wherein, if the proportion of metal pixels is greater than a first threshold value, the processor is configured to:
generate an expanded metal template based on the original reconstructed image, wherein the expanded metal template includes a two-dimensional or three-dimensional expansion for different pixels,
generate a metal-free, MAR image based on the expanded metal template and the original sinogram, and
generate a final image based on the expanded metal template and the metal-free, MAR image; and
wherein, if the proportion of metal pixels is less than a second threshold value, the processor is configured to:
generate an expanded metal template based on the original reconstructed image,
generate a metal-free, MAR image based on a treatment including weighting of the expanded metal template and the original sinogram, and
generate a final image based on the expanded metal template and the metal-free, MAR image.

10. The computed tomography apparatus according to claim 9, wherein if the proportion of metal pixels is greater than the first threshold value, the processor, in generating the expanded metal template based on the original reconstructed image is further configured to:
generate an original metal template;
perform a first expansion of the original metal template to generate a two-dimensional expanded metal template; and
perform a second expansion of the original metal template based on said two-dimensional expanded metal template to generate said expanded metal template, including a two-dimensional or three-dimensional expansion for different pixels.

11. The computed tomography apparatus according to claim 10, wherein in the two-dimensional expanded metal template, for each metal pixel, given a 20×20 pixel rectangle centering on said metal pixel, if no metal exists on the boundary of the 20×20 pixel rectangle and the number of metal pixels within the 20×20 pixel rectangle is not greater than 30, the processor is configured to perform a 2D expansion on said metal pixel of the original metal template; otherwise, the processor is configured to perform a 3D expansion on said metal pixel of the original metal template.

12. The computed tomography apparatus according to claim 9, wherein in generating a metal-free, MAR image when the proportion of metal pixels is greater than a first threshold value, the processor is further configured to:
perform an orthographic projection on the expanded metal template to generate a metal sinogram;
interpolate the metal sinogram and the original sinogram to generate an interpolated sinogram; and
perform a back projection on the interpolated sinogram to generate the metal-free, MAR image.

13. The computed tomography apparatus according to claim 9, wherein in generating a metal-free, MAR image when the proportion of metal pixels is less than a second threshold value, the processor is further configured to:
perform an orthographic projection on the expanded metal template to generate a metal sinogram;
interpolate the metal sinogram and the original sinogram to generate an interpolated sinogram;
weight the metal sinogram, the interpolated sinogram and the original sinogram to generate a mixed sinogram; and
perform a back projection on the mixed sinogram to generate the metal-free, MAR image.

14. The computed tomography apparatus according to claim 13, wherein in weighting the metal sonogram, the proceccor is further configured to:
subtract the metal sinogram fmetal from the original sinogram forig to obtain a difference forig-metal, and comparing the difference with the interpolated sinogram $f^{interpolation}$ for calculation of a coefficient coef as follows:

$$\begin{cases} coef = 1/(f^{orig\text{-}metal} - f^{interpolation}) & \text{if } f^{orig\text{-}metal} < f^{interpolation} \\ coef = 0 & \text{if } f^{orig\text{-}metal} > f^{interpolation} \end{cases};$$

then let T be:

$$\begin{cases} T = coef & \text{if } f^{orig\text{-}metal} < f^{interpolation} \\ T = 1 - coef & \text{if } f^{orig\text{-}metal} > f^{interpolation} \end{cases};$$

calculate two parameters p1 and p2 using a maximum value f max and a minimum value f min of the metal sinogram, $p1 = \alpha * f\min + (1-\alpha) * f\max$ $p2 = (1-\beta) * f_{min} + \beta * f\max$ wherein α and β are obtained by experiment; let α be 0.35 and β be 0.95 to calculate t as follows:

$$t = \frac{f^{orig} - p1}{p2 - p1};$$

then calculating a weight w as follows:

$$\begin{cases} w = w_{max} * T & \text{if } f(v, c, r) < p1 \\ w = w_{max}(1 - (6*t^5 - 15*t^4 + 10*t^3)) * T & \text{if } p2 > f(v, c, r) \geq p1 \\ w = 0 & \text{if } f(v, c, r) \geq p2 \end{cases}$$

wherein $W_{max}$ is a fixed value 0.5, and f (v,c,r) represents the projection value for view v, channel c, and row r; and
performing a weighting using the above weight to obtain a mixed sinogram fblend:

$f^{blend} = w * f^{orig\text{-}Metal} + (1-w) * f^{interpolation}.$

15. The computed tomography apparatus according to claim 9, wherein in generating a final image, the processor is further configured to add the expanded metal template and the metal-free, MAR image to generate the final image.

16. The computed tomography apparatus according to claim 9, wherein the first threshold value is greater than the second threshold value.

\* \* \* \* \*